United States Patent [19]
Shei et al.

[11] Patent Number: 5,114,911
[45] Date of Patent: May 19, 1992

[54] HOMOGENEOUS COPRECIPITATION METHOD FOR PREPARING YBACUO SUPERCONDUCTING POWDER

[75] Inventors: Cheng-Yie Shei, Taipei Hsien; Weir-Mirn Hurng; Chau-Ting Chang, both of Hsinchu, all of Taiwan

[73] Assignee: Industrail Technology Research Institute, Chutung, Taiwan

[21] Appl. No.: 658,055

[22] Filed: Feb. 20, 1991

[51] Int. Cl.$^5$ .............. C01B 13/36; C01F 11/02; C01F 17/00; C01G 3/02
[52] U.S. Cl. .............................. 505/1; 423/604; 423/635; 501/123; 501/126; 505/737; 505/738
[58] Field of Search .................. 505/1, 737, 738; 423/604, 635; 501/123, 126; 502/525

[56] References Cited

U.S. PATENT DOCUMENTS

| | | | |
|---|---|---|---|
| 4,804,649 | 2/1989 | Sherit | 423/593 |
| 4,895,832 | 1/1990 | Chang et al. | 501/123 |
| 4,898,851 | 2/1990 | Michel | 501/123 |
| 5,019,555 | 5/1991 | Chin et al. | 505/1 |

OTHER PUBLICATIONS

Pramanik "Preparation of Superconducting Ceramic Oxides by Co-Precipitation of Metal Ion Oxalates Using Triethyammonium-oxalate from mixed solvent", *Reviews of Solid State Science*, vol. 2, No. 2 & 3, Proceedings 1988, pp. 157-159.

Kayser "Preparation of High to $YBa_2Cu_3O_{7-x}$ powder from nitrate and oxalate precursors", Mat. Res. Soc. Symp. Proc., vol. 99, 1988 pp. 159-164.

*Primary Examiner*—Paul Lieberman
*Assistant Examiner*—John Boyd
*Attorney, Agent, or Firm*—Ladas & Parry

[57] ABSTRACT

An oxalate route coprecipitation process for preparing a superconducting YBaCuO system precursor powder comprises preparing an aqueous solution of nitrates of yttrium, barium and copper, which is then mixed with an organic solution containing a dibasic oxalate ester, an organic base and acetone. An ultrasound vibration is applied to the mixture to coprecipitate oxalates of yttrium, barium and copper. The decomposition of the oxalate ester is enhanced to an optimum rate as the result of the homogeneous phase contributed by acetone which is miscible with both water and the oxalate ester. The ultrasound vibration segregates the precipitate particles thereby preventing the coagulation of the particles and assuring fine and uniform particle size.

6 Claims, 8 Drawing Sheets

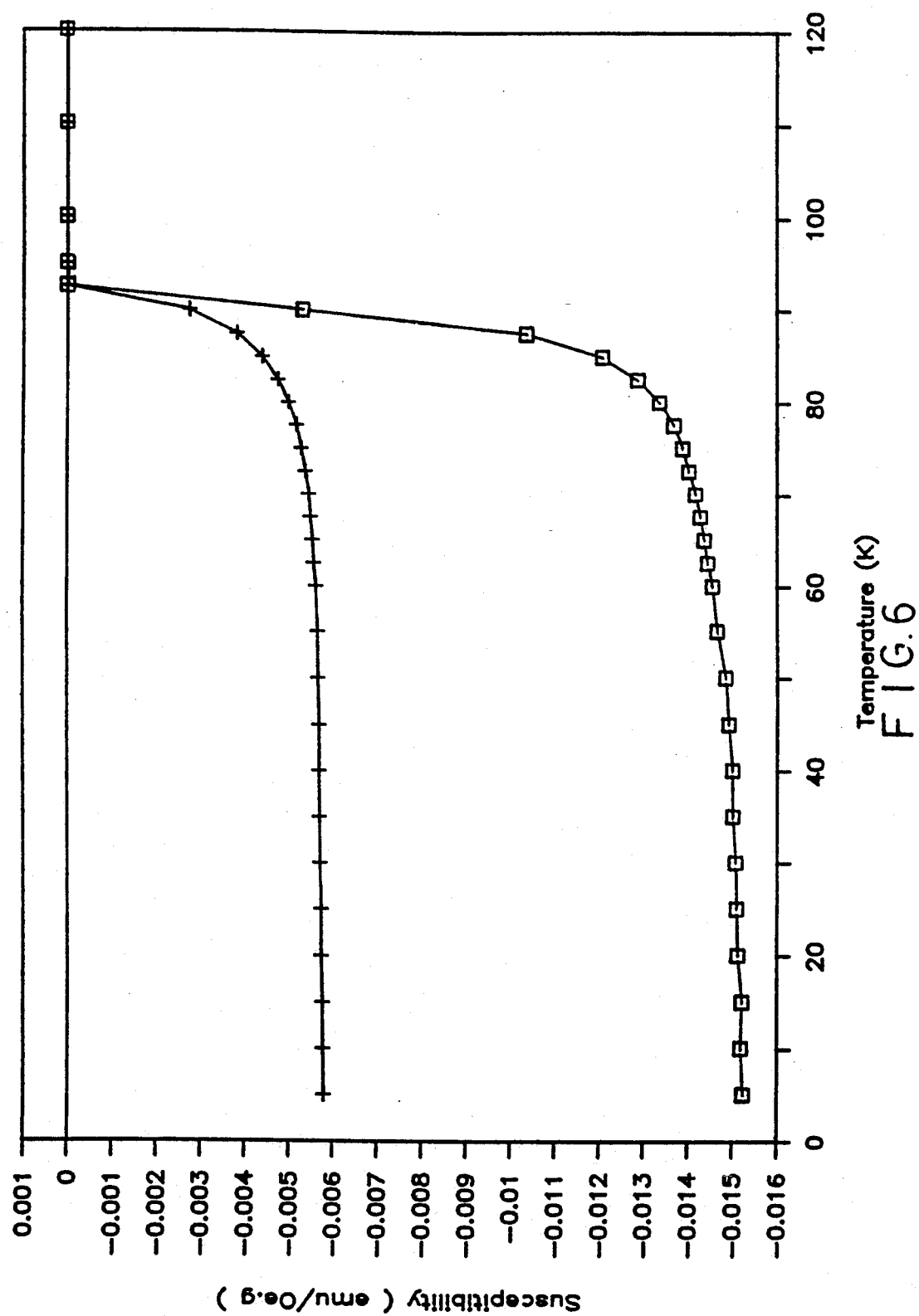

HOMOGENEOUS COPRECIPITATION METHOD FOR PREPARING YBACUO SUPERCONDUCTING POWDER

BACKGROUND OF THE INVENTION

This invention relates to a process for preparing a YBaCuO system superconducting precursor powder and particularly, to a process for preparing a fine and homogeneous YBaCuO system superconducting precursor powder by an oxalate route coprecipitation method using a dibasic oxalate ester as a precipitate forming agent.

The coprecipitation process for preparing a YBaCuO system superconducting precursor powder via an oxalate route is known in the art. U.S. Pat. No. 4,895,832 discloses a process in which nitrates of Y, Ba and Cu are dissolved in water and oxalates of Y, Ba and Cu are coprecipitated by adding oxalic acid to the aqueous solution of the nitrates. In an article, "Solid State communications, vol. 64, No. 6, pp.881-883, 1987 ", Wang et al disclose a process for preparing a superconducting precursor powder also via the oxalate route, wherein oxalates of Y, Cu and Ba are coprecipitated by adding an aqueous solution of oxalic acid to a mixture containing an aqueous solution of copper acetate plus yttrium nitrate and a solution of barium hydroxide plus acetic acid. Oxalic acid permits oxalates of Y, Cu and Ba to precipitate rapidly. It is, however, ineffective to achieve a fine and uniform superconducting powder.

Japanese Patent Application No. 63-285116 discloses an oxalate route coprecipitation process in which oxalates of Y, Ba and Cu are precipitated by adding an organic dibasic ester such as dimethyl or diethyl oxalate to an aqueous solution containing ions of Y, Ba and Cu. It is described in this patent that the process produces fine and uniform coprecipitates because ethyl oxalate gradually decomposes to deliver oxalate ions used to form oxalate precipitates. However, this process is found to be not so efficient as excepted because dibasic esters such as ethyl oxalate are not readily soluble in water. It is difficult to achieve a homogeneous phase when mixing ethyl oxalate and the aqueous solution so that a long period is required for the decomposition of ethyl oxalate to an efficient state. The decomposition rate of ethyl oxalate is so undesirably slow that oxalate particles formed priorly coagulate to large particles, resulting in disuniform precipitate particles. This process does not use a base to adjust the pH value of the solution and thus desired components in the solution are liable to be lost thereby adversely affecting the desired stochiometry of the final product.

SUMMARY OF THE INVENTION

An object of the invention is to provide an improved oxalate route coprecipitating process for producing a YBaCuO system superconducting precursor powder, which process still employs a dibasic oxalate ester as a precipitate forming agent, but is efficient to produce a fine and uniform superconducting powder, The particle size of the superconducting precursor powder obtained by this process is less than 0.5 micron.

Another object of the invention is to provide a process of coprecipitating oxalates of Y, Ba and Cu by a dibasic oxalate ester, which process is free of contamination and efficient to achieve a stochiometrically desirable product.

According to the present invention, a homogeneous coprecipitation process for preparing a superconducting YBaCuO system precursor powder comprises: (a) preparing an aqueous solution containing nitrates of yttrium, barium and copper; (b) preparing an organic solution by dissolving a dibasic ester in acetone, said dibasic ester being selected from the group consisting of dimethyl oxalate and diethyl oxalate; (c) adding an organic base in the organic solution for the adjustment of pH value; (d) mixing the aqueous solution and the organic solution; and (e) applying an ultrasound by an ultrasonic generator with a titanium tip to the mixture of the aqueous solution and the organic solution to coprecipitate oxalates of yttrium, barium and copper.

In the process of the present invention, a coprecipitation solution with a homogeneous phase is obtained by employing acetone which is miscible with both water and the dibasic esters. The dibasic oxalate ester can therefore dissociate at an optimum rate. The fine and uniform particle size is achieved by the application of ultrasonic wave vibration which prevents coagulation of precipitates by segregating precipitate particles. The ultrasonic wave vibration also improves the dissociation rate of the dibasic oxalate ester.

The organic base adjusts the pH value of the coprecipitation solution so as to assure effective coprecipitation of desired oxalates and prevent losses of desired components. The organic base may be diethyl or triethylamine. Unlike the inorganic base which is susceptible to contamination of coprecipitates, the organic base used in the present invention can be removed easily together with the liquid phase from the coprecipitates during the filtration process. Even when a small amount of the organic base is retained in the coprecipitates, it can escape from the coprecipitate when the coprecipitate is subjected to heat treatments such as calcining and sintering, to form a YBaCuO system superconductor. Therefore, this process will not create any contamination problem.

According to the invention, the weight of the dibasic ester used may be 1.2 times the total equivalent weight of ions of yttrium, barium and copper. The molar ratio of the dibasic ester and the organic base may be 1:1.8 to 1:2.2. The volumetric ratio of water and acetone may be 1:1.5–1:2.

The preferred examples of the invention will be described in detail with reference to the accompanying drawings. in which:

BRIEF DESCRIPTION OF THE DRAWINGS

FIG. 6 shows the magnetic properties of the superconductor of the present invention.

EXAMPLE 1

Solution (A) was prepared by dissolving 1.375 gm of yttrium nitrate, 2.614 gm of barium nitrate and 3.624 gm of copper nitrate in 80 ml of deionized water. Solution B was prepared by dissolving 5.3 ml of ethyl oxalate and 1.8 ml of triethylamine in 50 ml of acetone. Solution A and B were agitated to form a blue solution which was then treated by an ultrasound vibration to obtain a light blue coprecipitate. After 2 hours, the precipitate which reaches a pH value of about 1.8 was filtered. The collected coprecipitate was a fine blue powder. The coprecipitate was heated at 120 deg C. for 4 hours in 1 atm oxygen atmosphere for decomposition followed by calcining at 900 deg C. for 10 hours also in an oxygen atmosphere. The calcined substance was ground and formed into pellets by a pressing process. The pellets were then sintered at 950 deg C. for 30 hours, cooled slowly to 550 deg C. and annealed for 20 hours.

Figure 1A:
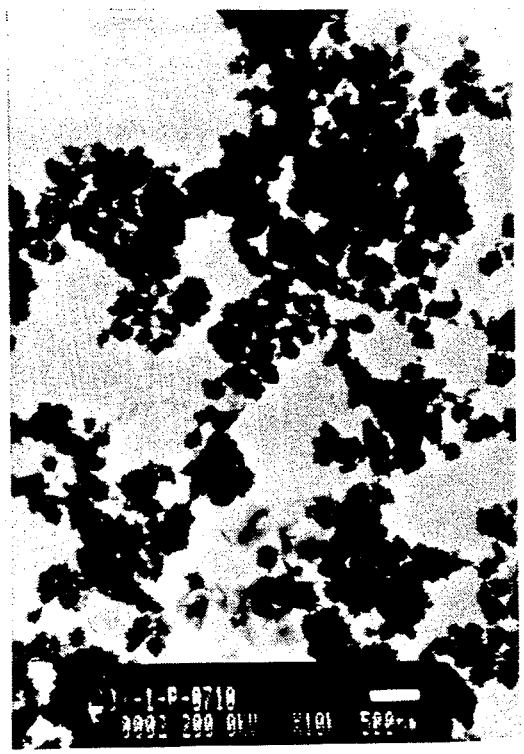
FIGS. 1a to 1c are SEM pictures of the coprecipitate of the present invention.
Figure 1B:
Figure 1C:
Figure 1D:
FIG. 1d is an electron diffraction pattern of the coprecipitate of the present invention.

FIGS. 1a and 1b show scanning electron microscopic (SEM) pictures of the coprecipitate from solutions A and B, which reflect that a large portion of the coprecipitate is constituted of particles of far below 0.5 um and a small portion thereof is constituted of particles of over 0.5 um. Greater magnification reveals that the coprecipitate is constituted of particles of 0.1–0.2 um (FIG. 1c). An electron diffraction pattern of the coprecipitate shows that the coprecipitate is in an amorphous state (FIG. 1d).

Figure 2A:
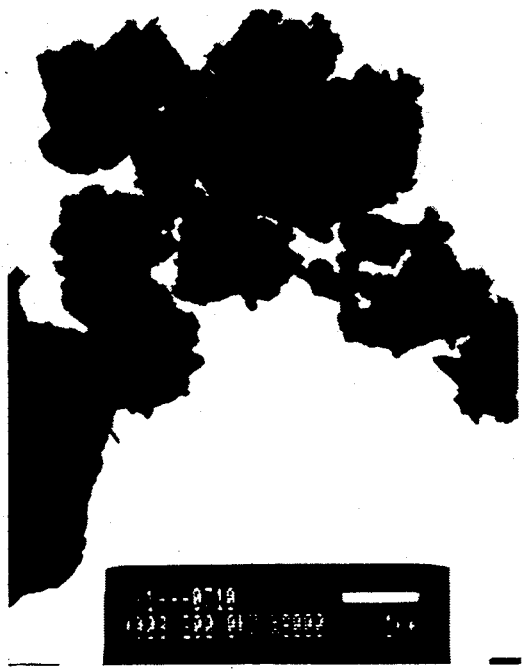
FIGS. 2a and 2b are images of SEM and an electron diffraction analysis of the calcined substance of the invention.
Figure 2B:
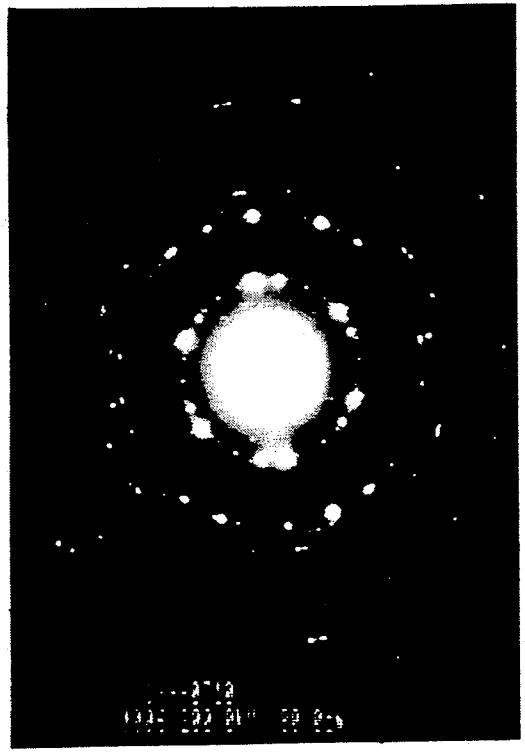

FIG. 2a is a SEM picture of the calcined powder, which shows that the powder becomes a coherent substance and the particle size is increased by a few microms. However, the particle size is still smaller than those obtained conventionally. The electron diffraction pattern of FIG. 2b reflects that the calcined powder is in a crystalline state.

Figure 3A:
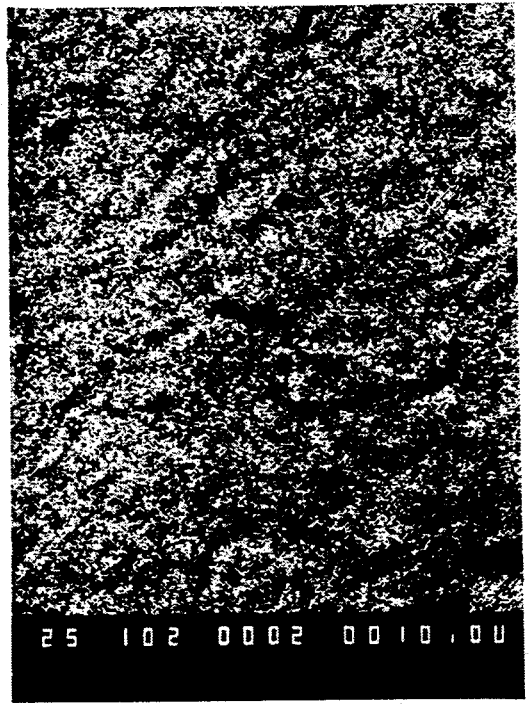
FIGS. 3a to 3c are EPMA pictures of the sintered substance of the invention.
Figure 3B:
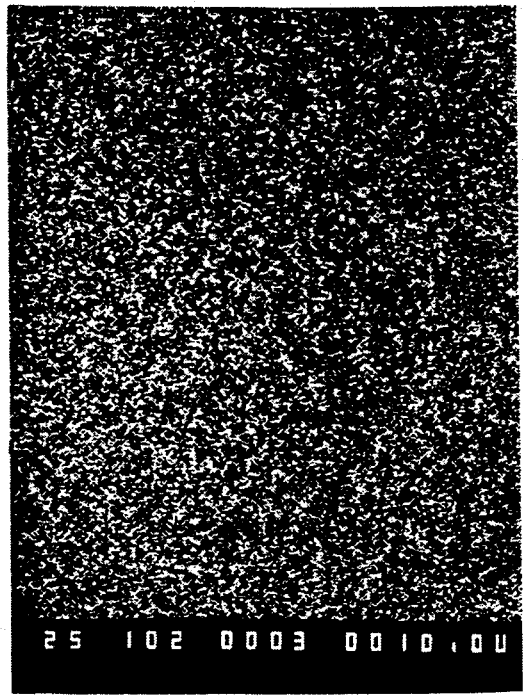
Figure 3C:
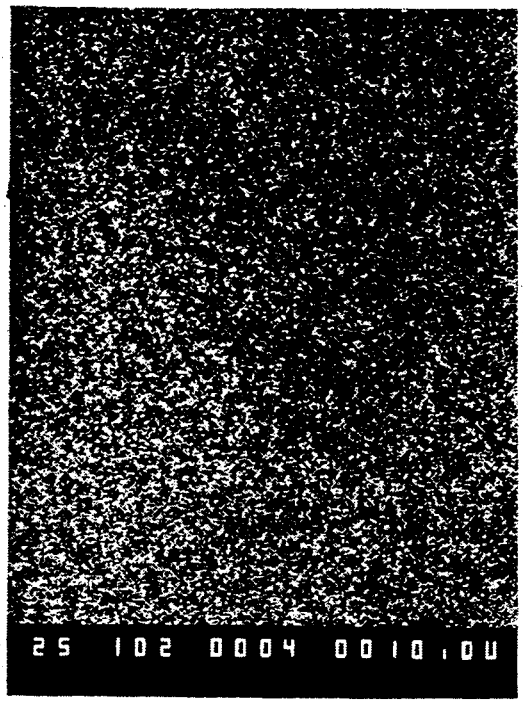
Figure 3D:
FIG. 3d is a SEM picture of the sintered substance.

EPMA pictures of FIGS. 3a, 3b and 3c show that the distributions of Y, Ba and Cu on the surface of the final sintered pellet are uniform. The SEM picture of FIG. 3d shows the good performance of the sintering process involving a partial-melting state which enables some crystals to grow to several microns.

Figure 4:
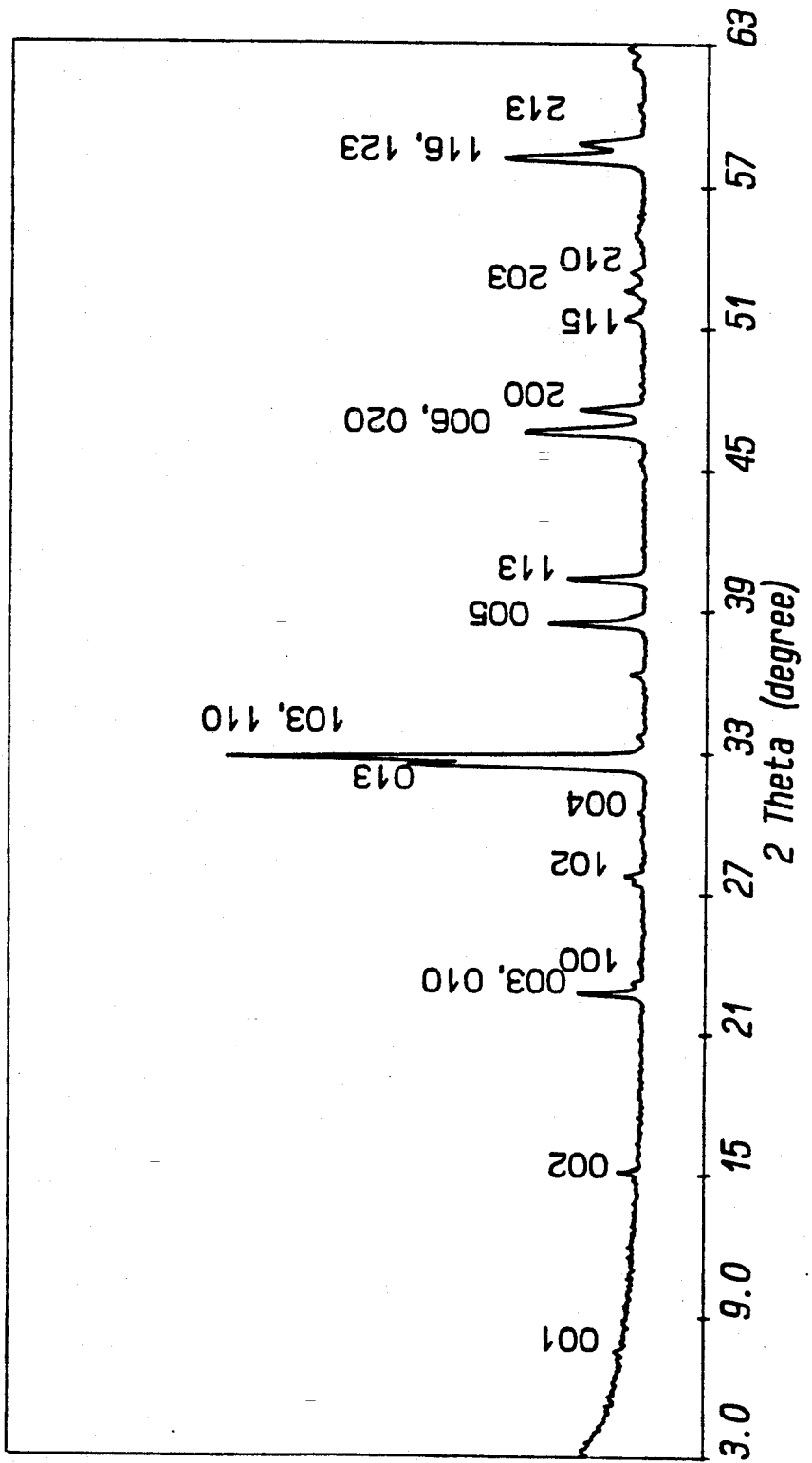
FIG. 4 is a X-ray diffraction pattern of the sintered substance.

FIG. 4 is a pattern resulting from a X-ray diffraction, which reflects that the sintered substance has a $YBa_2Cu_3O_y$ orthorohmbic structure almost devoid of impurities.

Figure 5:
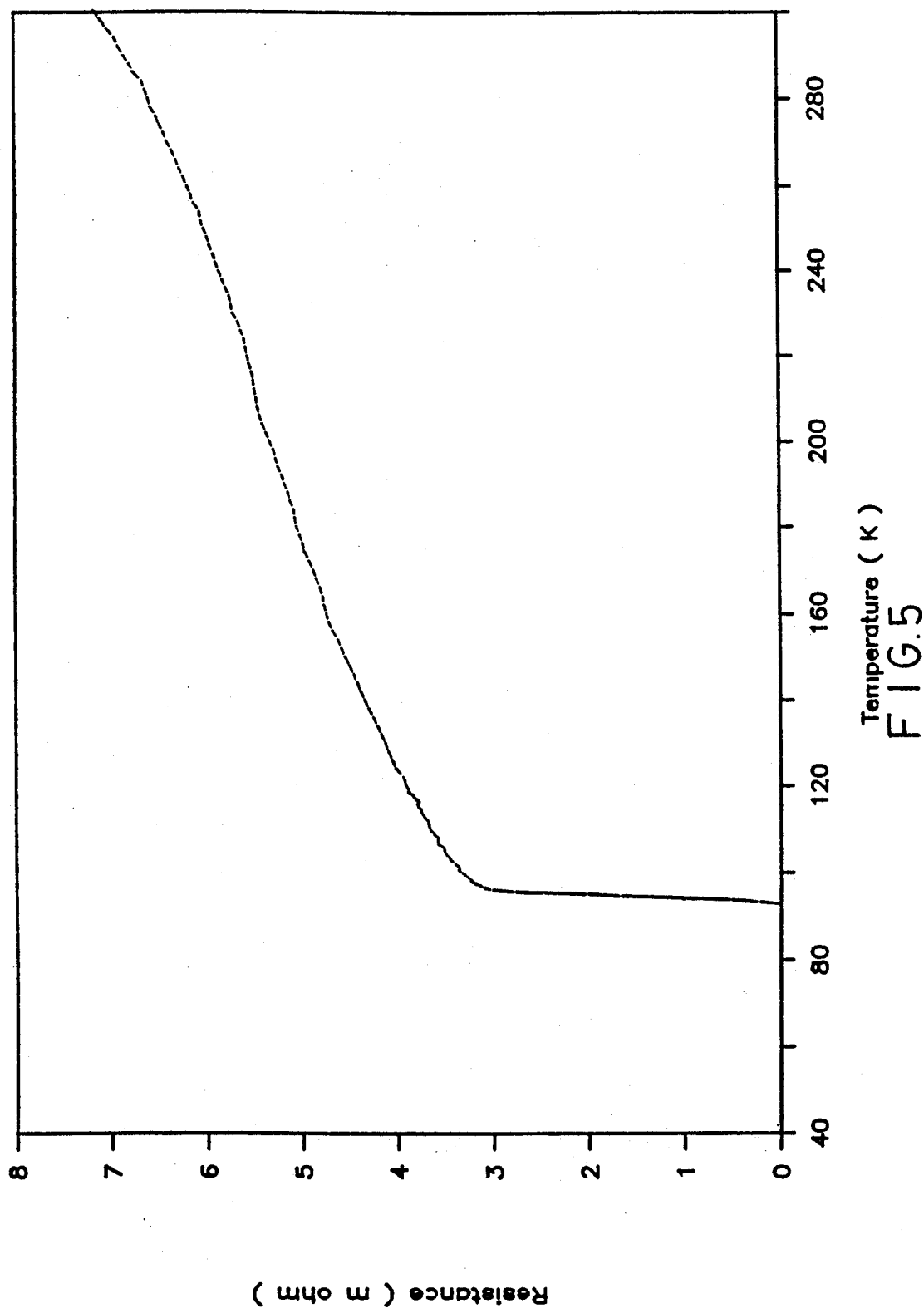
FIG. 5 is a diagram of resistance vs. temperature curve of the superconductor of the present invention.

FIG. 5 shows a resistance vs. temperature curve which indicates that the critical superconducting temperature is 92 deg K.

FIG. 6 is a SQUID picture which shows the magnetic properties of the superconducting pellet, which picture proves that pellet is in a single phase at 90 deg K.

COMPARATIVE EXAMPLE 1.6625 gm of yittrium nitrate, 2.61135 gm of barium nitrate and 3.624 gm copper nitrate are dissolved in 80 ml of water. 5.3 ml of diethyl oxalate and 10.8 ml of triethyl amine was added to and mixed with the solution. Since diethyl oxalate is not immiscible with water, the mixture obtained has two liquid phases, one being colorless (diethyl oxalate) and the other being deep blue (aqueous solution). The mixture was emulsified when agitated vigorously. When the mixture was heated to 85 deg C. for four hours, the oxalate phase did not disappear completely. The whole reaction took about 5 hours. After reaction, the remaining liquid had a volume of only 20 ml which was viscous and unable to produce precipitates.

With the invention thus explained, it is apparent that various modifications and variations can be made without departing from the scope of the invention. It is therefore intended that the invention be limited only as indicated in the appended claims.

I claim:

1. A homogeneous coprecipitation process for preparing a superconducting YBaCuO system precursor powder comprising:
   (a) preparing an aqueous solution containing nitrates of yttrium, barium and copper;
   (b) preparing an organic solution by dissolving a dibasic ester in acetone, said dibasic ester being selected from the group consisting of dimethyl oxalate and diethyl oxalate;
   (c) adding an organic base in the organic solution for the adjustment of pH value;
   (d) mixing the aqueous solution and the organic solution; and
   (e) applying an ultrasound vibration to the mixture of the aqueous solution and the organic solution to coprecipitate oxalates of yttrium, barium and copper.

2. A process as claimed in claim 1, wherein the weight of the dibasic ester used is 1.2 times the total equivalent weight of ions of yttrium, barium and copper.

3. A process as claimed in claim 1, wherein the molar ratio of the dibasic ester and the organic base is 1:1.8 to 1:2.2.

4. A process as claimed in claim 1, wherein the volumetric ratio of water and acetone is 1:1.5–1:2.

5. A process as claimed in claim 1, wherein the power of the supersonic vibration of about 50 W to 150 W.

6. A process as claimed in claim 1, wherein the organic base is selected from the group consisting of diethyl amine and triethyl amine.

* * * * *